United States Patent [19]

Moberly

[11] 4,328,132
[45] May 4, 1982

[54] COLOR STABILIZATION OF FLAME RETARDANT

[75] Inventor: Charles W. Moberly, Bartlesville, Okla.

[73] Assignee: Phillips Petroleum Company, Bartlesville, Okla.

[21] Appl. No.: 17,883

[22] Filed: Mar. 6, 1979

[51] Int. Cl.³ ............... C09D 5/18; C09K 3/28; C07D 251/70
[52] U.S. Cl. ............... 252/606; 106/18.18; 544/195; 524/711; 524/787
[58] Field of Search ............... 252/8.1, 606; 260/45.7 PH; 106/18.18; 544/195

[56] References Cited

U.S. PATENT DOCUMENTS

| | | | |
|---|---|---|---|
| 2,579,572 | 12/1951 | Hendricks | 260/45.7 PH |
| 2,642,408 | 6/1953 | Stanin et al. | 260/32.6 N |
| 3,039,999 | 6/1962 | Linville et al. | 260/45.7 PH |
| 3,322,718 | 5/1967 | Jacob | 260/45.8 NT |
| 3,325,447 | 6/1967 | Kasparik | 260/45.9 R |
| 3,422,048 | 1/1969 | Cannelongo | 252/8.1 X |
| 3,449,292 | 6/1969 | Snedeker | 260/45.7 PH |
| 3,658,753 | 4/1972 | Reed et al. | 260/45.7 P |
| 3,717,577 | 2/1973 | Moon | 260/45.7 S |
| 3,855,134 | 12/1974 | Green et al. | 252/8.1 |
| 4,010,137 | 3/1977 | Brady | 252/8.1 X |
| 4,140,856 | 2/1979 | Bost et al. | 544/195 |

*Primary Examiner*—Richard D. Lovering

[57] ABSTRACT

Undesirable color formation during the preparation of a cured intumescent flame retardant is minimized by including a color stabilizing amount of at least one of certain metal phosphites, hypophosphites, sulfites and bisulfites.

21 Claims, No Drawings

COLOR STABILIZATION OF FLAME RETARDANT

This invention relates to flame retardants. More particularly, this invention relates to a non-halogenated flame retardant suitable for incorporation into thermoplastics.

Fire safety rules have increasingly affected the market for flammable plastics. Many plastics can be made flame retardant by incorporating therein a halogenated organic material which decomposes, on heating, in such a fashion as to reduce the flammability of the plastic. However, consumer alarm over the possible release of toxic gases during combustion of such flame retarded plastics has spurred development of other non-halogenated flame retardant additives and flame retardant systems.

Intumescent flame retardants have been developed as alternatives for the halogenated flame retardants. However, incorporation of an intumescent flame retardant within a thermoplastic is generally precluded due to void formation during processing caused by triggering of the gas generating "intumescent reaction" between the components of the flame retardant at processing temperature. Consequently, such intumescent flame retardants must be used as coatings rather than incorporated into the plastic. However, such coatings can be lost if melting of the plastic during combustion carries the coating away from the surface to be protected.

An intumescent flame retardant has been developed which can be incorporated in thermoplastic prior to molding. This flame retardant is disclosed in U.S. Pat. No. 4,010,137, which issued Mar. 1, 1977, on application Ser. No. 641,042, filed Dec. 15, 1975 by Donnie G. Brady. The disclosure of U.S. Pat. No. 4,010,137 is incorporated herein by reference. Such intumescent flame retardant is the product which results when (1) at least one phosphorus oxide compound of the formula $(P_2O_5)_{0.5-1.0}(H_2O)_{0.01-1.5}$, (2) melamine, and (3) at least one saturated open chain polyol containing from 5 to 15 carbon atoms and from 4 to 8 hydroxyl groups are combined and heated under such conditions that the product will not cause significant foaming of the thermoplastic when a thermoplastic containing it is subsequently subjected to molding conditions.

It has been discovered that even when steps are taken to substantially exclude oxygen during the preparation of that flame retardant composition the composition obtained tends to have a color ranging from off-white to tan to dark brown rather than white. It is desirable for many applications for the intumescent flame retardant to be essentially white since it is blended with polymers at levels which could impart an undesirable color to the final thermoplastic composition if the flame retardant were not essentially white.

Accordingly, it is an object of this invention to provide a method for minimizing dark color formation in the preparation of a cured phosphorus-containing intumescent flame retardant.

It is another object of this invention to provide a cured intumescent flame retardant composition of improved color.

Other aspects, objects, and advantages of the present invention will be apparent to those skilled in the art having the benefit of the present disclosure.

In accordance with the present invention undesirable color formation during the preparation of the phosphorus-containing retardant is inhibited by including among the reactants employed a color stabilizing amount of at least one color stabilizing inorganic metal compound selected from the group consisting of orthophosphites and hypophosphites of alkali metals, alkaline earth metals, or manganese; and sulfites and bisulfites of alkali metals. Specific examples include barium hypophosphite, calcium orthophosphite, magnesium hypophosphite, potassium dihydrogen orthophosphite, sodium monohydrogen orthophosphite, sodium dihydrogen orthophosphite, cesium sulfite, lithium sulfite, potassium hydrogen sulfite, potassium sulfite, sodium hydrogen sulfite sodium sulfite, rubidium sulfite and the like mixtures. Presently, preferred compounds because of availability, purity, relatively low costs and/or efficiency are the hypophosphites of calcium, sodium and manganese, sodium dihydrogen orthophosphite and sodium hydrogen sulfite.

Since the hypophosphites give off some phosphine during the formation of the flame retardant, precautions must be taken to minimize human exposure to the phosphine. The small amounts of phosphine liberated can be reacted with the oxygen in air to form $H_3PO_4$ which can be neutralized with lime to form calcium phosphate. Phosphine evolution does not appear to be a problem when the finished product is employed as a flame retardant.

The color stabilizing inorganic metal compound or compounds can be employed in any amount which results in a lighter product. Generally, the total amount of color stabilizing inorganic metal compound is in the range of about 0.5 to about 5 weight percent of the total weight of other reactants employed in forming the flame retardant.

The point at which the color stabilizing inorganic metal compound is combined with the other flame retardant reactants can vary. However, the later that the color stabilizing compound is added during the heating, generally the less color improvement there will be. Accordingly, it is preferred that the color stabilizing compound be combined with the other reactants at the outset of their heating.

It has been found that even small amounts of the color stabilizing compounds will give substantial improvements in the color of the final flame retardant when the heating of the reactants is carried out in a substantially oxygen-free atmosphere. As the amount of oxygen in the atmosphere in which the heating is conducted is increased, additional amounts of the color stabilizing compounds are necessary in order to obtain an improvement. Thus in order to obtain lightly colored phosphorus-containing flame retardants, it is preferred that the heating be conducted in a substantially oxygen free atmosphere. The exclusion of oxygen can be accomplished by maintaining an inert atmosphere, such as nitrogen, helium, argon, methane, n-butane, and the like, or by maintaining a reduced pressure, while the reactants are heated.

The present invention and its advantages are further illustrated by the following examples:

EXAMPLE I

A series of phosphorus-containing flame retardant compositions was prepared in a Brabender plastograph at 260° C. under a nitrogen atmosphere at 50 RPM for 30 minutes. The amount of dry material charged to the mixing chamber was 55 g, unless otherwise specified, plus metal salt (color improver), if used. The flame retardant reactants consisted of 26 wt. % phosphorous pentoxide, 34 wt. % dipentaerythritol, and 40 wt. % melamine. Following the mixing period the mixture was removed from the mixing chamber and cured for 1½ hours in an air oven maintained at 260° C.

After the curing period, each batch was removed from the oven cooled to room temperature and ground to a fine powder by means of a mortar and pestle.

Each flame retardant composition, in an amount of about 45 parts by weight per 100 parts by weight polymer, was incorporated into polypropylene fluff containing about 0.01% of 2, 6-di-t-butyl-4-methylphenol as antioxidant by mixing on a three inch, two-roll mill at about 165° C. for 5 minutes. The nominal melt flow of the polypropylene as determined by ASTM D 1238-65T, condition L, was about 4. After hot roll milling, a portion of each polymer blend was compression-molded at about 200° C. into a slab having dimensions of about $2\frac{1}{2} \times 5 \times \frac{1}{8}$ inches (6.4×13×0.32 cm). Each slab, after removal from the press, was cut into $5 \times \frac{1}{2}$ inch strips for UL-94 flammability tests. Two of the strips were further cut into $5 \times \frac{1}{4}$ inch strips for oxygen index (O.I.) tests. A description of these two tests is given under Table II of U.S. Pat. No. 4,026,810.

The nature and quantity of each color improver employed, color of the molded polypropylene slabs containing the flame retardant composition and the results of UL-94 and O.I. determinations are given in the Table I.

ployed in preparing the intumescent flame retardant a color stabilizing amount of at least one color stabilizing inorganic metal compound selected from the group consisting of orthophosphites and hypophosphites of alkali metals, alkaline earth metals, or manganese; and sulfites and bisulfites of alkali metals.

2. A method, according to claim 1 wherein the color stabilizing inorganic metal compound is employed in an amount in the range of about 0.5 to about 5 weight percent of the total weight of the other reactants employed in producing the intumescent flame retardant.

3. A method according to claim 2 wherein the heating of the reactants is carried out in a substantially oxygen-free atmosphere.

4. A method according to claim 3 wherein said at least one inorganic metal compound is selected from the group consisting of barium hypophosphite, calcium orthophosphite, magnesium hypophosphite, potassium dihydrogen orthophosphite, sodium monohydrogen orthophosphite, sodium hydrogen sulfite, sodium sulfite, and rubidium sulfite.

5. A method according to claim 3 wherein the color stabilizing inorganic metal compound is selected from the group consisting of orthophosphites of alkali metals, alkaline earth metals, or manganese.

6. A method according to claim 5 wherein the color stabilizing inorganic metal compound is sodium monohydrogen orthophosphite pentahydrate.

7. A method according to claim 3 wherein the color

TABLE I

| Color Improver | | Polymer Composition | | |
|---|---|---|---|---|
| Name | Parts Per 100 Parts Other Reactants | Color | UL-94 Test | Oxygen Index |
| None (control)[a] | 0 | brown | V-O | 29 |
| Sodium hypophosphite monohydrate | 0.75 | dark tan | V-O | 32 |
| Sodium hypophosphite monohydrate | 1.33 | light tan | V-O | 31 |
| Sodium hypophosphite monohydrate | 2.0 | very light tan | V-O | 32 |
| Calcium hypophosphite | 1.33 | tan | V-O | 32 |
| Manganous hypophosphite | 1.33 | light tan | V-O | 32 |
| Sodium monohydrogen orthophosphite pentahydrate | 1.5 | dark tan | V-O | 32 |
| Sodium monohydrogen orthophosphite pentahydrate | 3.0 | tan | V-O | 31 |
| Sodium bisulfite | 1.5 | light brown | V-O | 31 |

[a]Only 50 grams charged to mixing chamber.

Inspection of the results presented in Table I show that the employment of each specified metal salt in the preparation of the flame retardant results in a flame retardant when subsequently admixed with polypropylene gives polymer compositions of lighter color than the control. This indicates that each metal salt serves as color stabilizer in the preparation of the flame retardant composition. It can also be seen from the results of the UL-94 and O.I. tests that the color improvement is obtained with no sacrifice of flame retardant properties for the polymer compositions.

What is claimed is:

1. A method for minimizing undesirable color formation during the preparation of a cured intumescent flame retardant prepared by combining and heating (a) at least one phosphorus oxide compound of the formula $(P_2O_5)_{0.5-1.0}(H_2O)_{0.0-1.5}$, (b) melamine, and (c) at least one saturated open chain polyol containing from 5 to 15 carbon atoms and from 4 to 8 hydroxyl groups, said method comprising, including among the reactants emstabilizing inorganic metal compound is selected from the group consisting of sulfites or bisulfites of alkali metals.

8. A method according to claim 3 wherein the color stabilizing inorganic metal compound is selected from the group consisting of bisulfites of alkali metals.

9. A method according to claim 8 wherein the color stabilizing inorganic metal compound is sodium bisulfite.

10. A method according to claim 3 wherein the color stabilizing inorganic metal compound is selected from the group consisting of sodium hypophosphite monohydrate, calcium hypophosphite, and manganous hypophosphite.

11. A phosphorus-containing flame retardant which is prepared by combining and heating (a) at least one phosphorus oxide compound of the formula $(P_2O_5)_{0.5-1.0}(H_2O)_{0.0-1.5}$, (b) melamine, (c) at least one saturated open chain polyol containing from 5 to 15 carbon atoms and from 4 to 8 hydroxyl groups, and (d) a color stabilizing amount of at least one color stabilizing compound selected from the group consisting of orthophosphites and hypophosphites of alkali metals, alkaline earth metals, or manganese; and sulfites and bisulfites of alkali metals.

12. A phosphorus-containing flame retardant according to claim 11 wherein the heating of the reactants is carried out under a substantially oxygen-free atmosphere and the amount of color stabilizer compound employed is in the range of about 0.5 to about 5 weight percent of the total weight of the other reactants employed in producing the intumescent flame retardant.

13. A phosphorus-containing flame retardant according to claim 12 wherein said at least one color stabilizing compound is selected from the group consisting of barium hypophosphite, calcium orthophosphite, magnesium hypophosphite, potassium dihydrogen orthophosphite, sodium monohydrogen orthophosphite, sodium dihydrogen orthophosphite, cesium sulfite, lithium sulfite, potassium hydrogen sulfite, potassium sulfite, sodium hydrogen sulfite, sodium sulfite, and rubidium sulfite.

14. A phosphorus-containing flame retardant according to claim 13 wherein said at least one phosphorus oxide compound is phosphorus pentoxide and said at least one polyol is dipentaerythritol.

15. A phosphorus-containing flame retardant according to claim 12 wherein the color stabilizing inorganic metal compound is selected from the group consisting of thophosphites of alkali metals, alkaline earth metals, or manganese.

16. A phosphorus-containing flame retardant according to claim 14 wherein the color stabilizing inorganic metal compound is sodium monohydrogen orthophosphite pentahydrate.

17. A phosphorus-containing flame retardant according to claim 16 wherein said at least one phosphorus oxide compound is phosphorus pentoxide and said at least one polyol is dipentaerythritol.

18. A phosphorus-containing flame retardant according to claim 12 wherein the color stabilizing inorganic metal compound is selected from the group consisting of sulfites or bisulfites of alkali metals.

19. A phosphorus-containing flame retardant according to claim 18 wherein the color stabilizing inorganic metal compound is selected from the group consisting of bisulfites of alkali metals.

20. A phosphorus-containing flame retardant according to claim 19 wherein the color stabilizing inorganic metal compound is sodium bisulfite.

21. A phosphorus-containing flame retardant according to claim 20 wherein said at least one phosphorus oxide compound is phosphorus pentoxide and said at least one polyol is dipentaerythritol.

* * * * *

UNITED STATES PATENT AND TRADEMARK OFFICE
CERTIFICATE OF CORRECTION

PATENT NO. : 4,328,132
DATED : May 4, 1982
INVENTOR(S) : Charles W. Moberly

It is certified that error appears in the above—identified patent and that said Letters Patent is hereby corrected as shown below:

Column 6, line 7, delete "14" and substitute therefor --- 15 ---.

Signed and Sealed this

Twenty-fourth Day of August 1982

[SEAL]

Attest:

GERALD J. MOSSINGHOFF

Attesting Officer

Commissioner of Patents and Trademarks